(12) United States Patent
Younger

(10) Patent No.: US 8,234,784 B2
(45) Date of Patent: Aug. 7, 2012

(54) VALVE PISTON REPOSITIONING APPARATUS AND METHOD

(76) Inventor: Steven W. Younger, Hacienda Heights, CA (US)

(*) Notice: Subject to any disclaimer, the term of this patent is extended or adjusted under 35 U.S.C. 154(b) by 1067 days.

(21) Appl. No.: 12/030,592

(22) Filed: Feb. 13, 2008

(65) Prior Publication Data
US 2009/0199403 A1    Aug. 13, 2009

(51) Int. Cl.
*F15B 13/04* (2006.01)
*F16H 61/02* (2006.01)
*B23P 6/00* (2006.01)

(52) U.S. Cl. ............ 29/888.041; 29/888; 29/402.06; 29/402.04; 29/216; 29/226; 29/801; 29/808

(58) Field of Classification Search ............ 29/225–230, 29/402.01–402.08, 801, 808, 890.121, 888.01
See application file for complete search history.

(56) References Cited

U.S. PATENT DOCUMENTS

| | | | | |
|---|---|---|---|---|
| 1,874,248 A * | 8/1932 | Davis | ............ | 180/440 |
| 3,009,524 A * | 11/1961 | Ostwald | ............ | 180/417 |
| 3,565,220 A * | 2/1971 | Lammers et al. | ............ | 192/220.1 |
| 3,621,761 A * | 11/1971 | Alderson | ............ | 91/491 |
| 3,667,867 A * | 6/1972 | Boydel et al. | ............ | 417/222.1 |
| 3,710,909 A * | 1/1973 | Johnson | ............ | 192/85.57 |
| 3,756,283 A * | 9/1973 | Angelery | ............ | 137/630.15 |
| 4,282,781 A * | 8/1981 | Iwanaga et al. | ............ | 477/141 |
| 4,308,765 A | 1/1982 | Iwanaga | | |
| 4,313,354 A | 2/1982 | Iwanaga | | |
| 4,347,765 A | 9/1982 | Leonard et al. | | |
| 4,506,564 A | 3/1985 | Coutant | | |
| 4,553,620 A * | 11/1985 | Eckhardt et al. | ............ | 180/6.48 |
| 4,565,067 A * | 1/1986 | Tani et al. | ............ | 60/545 |
| 4,750,514 A * | 6/1988 | Omori et al. | ............ | 137/339 |
| 4,813,447 A * | 3/1989 | Ichiryu et al. | ............ | 137/486 |
| 4,962,819 A * | 10/1990 | Bailey et al. | ............ | 175/218 |
| 5,024,656 A * | 6/1991 | Gasaway et al. | ............ | 604/70 |
| 5,026,124 A * | 6/1991 | Resch | ............ | 303/122.01 |
| 5,103,954 A * | 4/1992 | Muncke et al. | ............ | 192/3.58 |
| 5,143,116 A * | 9/1992 | Skoglund | ............ | 137/487 |
| 5,157,608 A | 10/1992 | Sankpal et al. | | |
| 5,305,663 A * | 4/1994 | Leonard et al. | ............ | 475/123 |
| 5,460,582 A | 10/1995 | Palansky et al. | | |
| 5,473,896 A * | 12/1995 | Bergelin et al. | ............ | 60/589 |
| 5,612,874 A | 3/1997 | Schulz et al. | | |
| 6,273,526 B1 * | 8/2001 | Wachi et al. | ............ | 303/114.1 |
| 6,543,472 B2 * | 4/2003 | Stafford | ............ | 137/454.2 |
| 6,585,002 B2 * | 7/2003 | Stafford | ............ | 137/539 |
| 6,619,323 B1 * | 9/2003 | Stafford | ............ | 137/625.69 |
| 6,722,385 B1 * | 4/2004 | Bolaski | ............ | 137/15.17 |
| 6,832,632 B1 * | 12/2004 | Wallace | ............ | 137/625.66 |

(Continued)

*Primary Examiner* — Derris Banks
*Assistant Examiner* — Kaying Kue
(74) *Attorney, Agent, or Firm* — Kenneth L. Green

(57) ABSTRACT

Apparatus and method for extending the life of a booster valve in an automatic transmission. The booster valve commonly resides in the pump stator body and is modulated by reverse oil pressure and pressure control solenoid pressure signals. Pressure signals from the reverse oil pressure and the pressure control solenoid force a booster valve piston towards a pressure regulator valve piston also generally residing in the pump stator body. The booster valve piston slides inside a booster valve sleeve, and over time, the booster valve sleeve wears and the performance of the booster valve degrades or fails. The present invention replaces an original inner booster valve spring with a longer (or in some cases shorter) replacement booster valve spring to shift the operating range of the booster valve piston to an unworn portion of the booster valve sleeve to extend the life of the booster valve.

12 Claims, 6 Drawing Sheets

U.S. PATENT DOCUMENTS

| | | |
|---|---|---|
| 6,912,850 B2 * | 7/2005 | Verbo et al. ............... 60/553 |
| 6,959,694 B2 * | 11/2005 | Kieferle et al. ............ 123/446 |
| 6,990,996 B2 | 1/2006 | Stafford |
| 7,107,746 B2 * | 9/2006 | Melone et al. ............. 56/15.8 |
| 7,472,935 B2 * | 1/2009 | Love ......................... 293/134 |
| 2001/0031681 A1 * | 10/2001 | Green ........................ 475/129 |
| 2002/0095933 A1 * | 7/2002 | Takada et al. ............... 60/487 |
| 2003/0056642 A1 * | 3/2003 | Kobayashi ................ 91/369.2 |
| 2003/0213471 A1 * | 11/2003 | Kieferle et al. ............ 123/447 |
| 2004/0046445 A1 * | 3/2004 | Verbo et al. .............. 303/114.3 |
| 2005/0183775 A1 * | 8/2005 | Cheong ...................... 137/491 |
| 2006/0249340 A1 * | 11/2006 | Love ........................ 188/266.2 |
| 2007/0180805 A1 * | 8/2007 | Melone et al. ............. 56/15.8 |
| 2007/0295923 A1 * | 12/2007 | Akutagawa et al. ........ 251/120 |
| 2010/0026083 A1 * | 2/2010 | Leiber et al. .................. 303/3 |

* cited by examiner

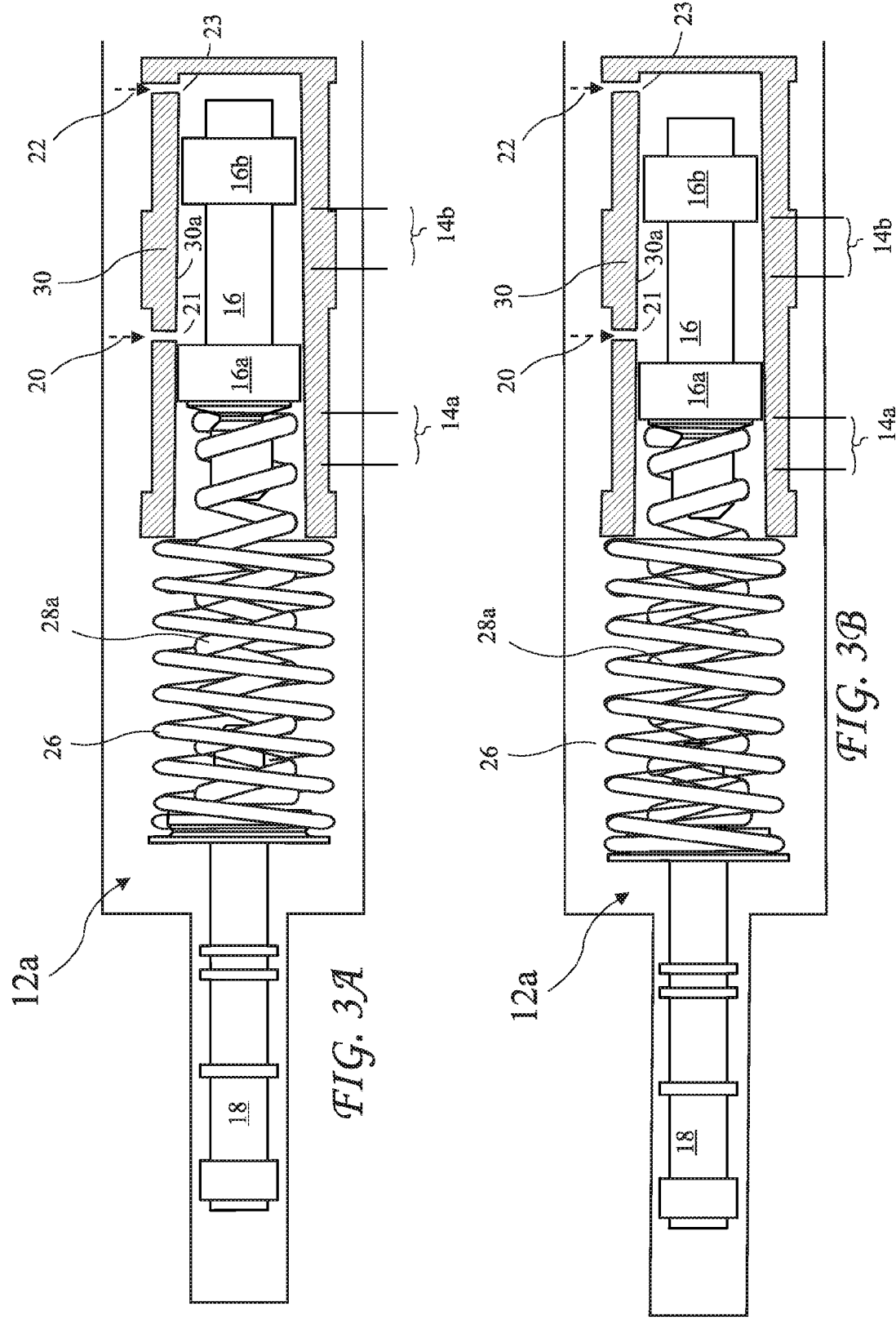

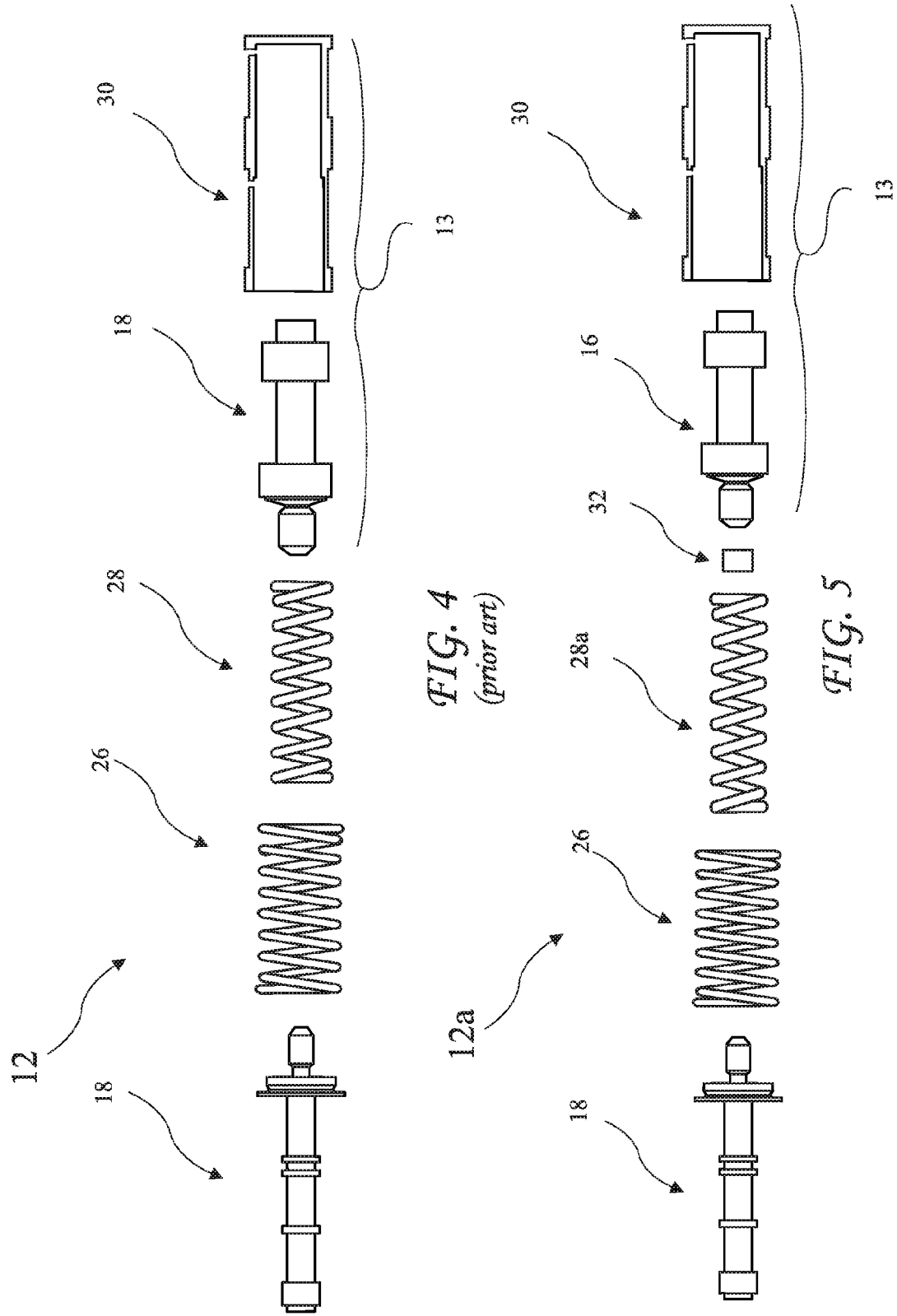

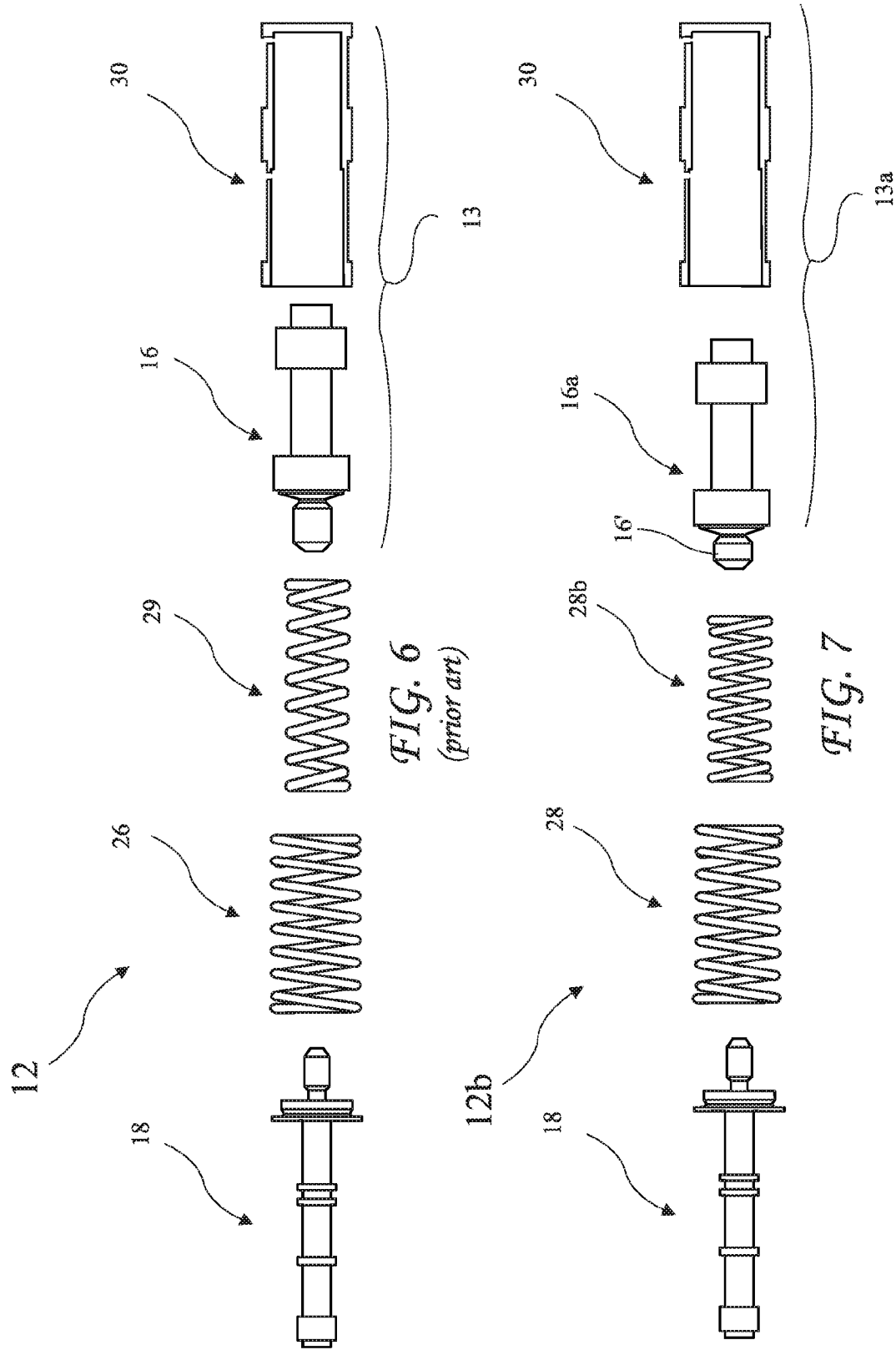

VALVE PISTON REPOSITIONING APPARATUS AND METHOD

BACKGROUND OF THE INVENTION

The present invention relates to valve repair and in particular to apparatus and methods for extending the life of an automatic transmission valve by modifying the valve to shift a valve piston from a worn region of a valve sleeve to an unworn region of the valve sleeve.

Automatic transmissions are commonly used in cars and trucks. Such automatic transmissions rely on a pump and system of valves to route a fluid flow to selectively lock and unlock gears to control the overall gear ratio through the transmission. The valves wear over time and eventually fail requiring service. The cost of replacing entire valve bodies can be quite high, and as a result, methods for repairing existing valve bodies have been developed.

U.S. Pat. No. 6,832,632 for "Boost Valve Assembly," discloses a direct replacement booster valve assembly to replace a worn booster valve. The replacement valve of the '632 patent includes a new hard-anodized booster valve piston and a new aluminum booster valve sleeve. While the repair method of the '632 patent is a solution to the problem of valve wear, the parts are fairly expensive and therefore a need remains for a low cost solution to automatic transmission valve wear. The '632 patent is herein incorporated in its entirety by reference.

BRIEF SUMMARY OF THE INVENTION

The present invention addresses the above and other needs by providing apparatus and method for extending the life of a booster valve in an automatic transmission. The booster valve commonly resides in the pump stator body and is modulated by reverse oil pressure and pressure control solenoid pressure signals. Pressure signals from the reverse oil pressure and the pressure control solenoid force a booster valve piston towards a pressure regulator valve piston also generally residing in the pump stator body. The booster valve piston slides inside a booster valve sleeve, and over time, the booster valve sleeve wears and the performance of the booster valve degrades or fails. The present invention replaces an original inner booster valve (or bumper) spring with a longer (or in some cases shorter) replacement booster valve spring to shift the operating range of the booster valve piston to an unworn portion of the booster valve sleeve to extend the life of the booster valve.

In accordance with one aspect of the invention, there is provided a method for extending the life of an automatic transmission booster valve. The method includes the steps of partially disassembling the automatic transmission to access a pump stator body of the automatic transmission and removing a booster valve sleeve and a booster valve piston from the pump stator body. An original inner booster valve (or bumper) spring normally residing between the booster valve piston and a pressure regulator valve piston, inside an outer (or pressure regulator valve) spring is removed and replaced with a replacement inner booster valve spring having a longer length and higher spring rate than the original inner booster valve spring. The replacement inner booster valve spring is configured to shift an operating range of the booster valve piston from a worn portion of a booster valve passage in the booster valve sleeve to an unworn portion of the booster valve passage and thereby extend the life of the original booster valve piston and sleeve.

In accordance with another aspect of the invention, there is provided a replacement booster valve inner spring to extend the life of the original booster valve piston and sleeve. The replacement booster valve inner spring is longer and has a higher spring rate than the original booster valve inner spring and thereby extends the life of the original booster valve piston and sleeve. A bumper shim preferably resides inside the replacement booster valve inner spring to prevent contact of the booster valve piston and a pressure regulator valve piston.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 3A shows a rest position of a repaired booster valve and pressure regulator valve assembly with the booster valve piston rest position shifted by a replacement longer inner booster valve spring according to the present invention.

FIG. 3B shows an actuated position of the repaired booster valve and pressure regulator valve assembly including the replacement inner booster valve spring according to the present invention.

FIG. 4 shows a detailed exploded view of the prior art booster valve and pressure regulator valve assembly.

FIG. 5 shows a detailed exploded view of the repaired booster valve and pressure regulator valve assembly including the replacement longer inner booster valve spring and a bumper shim according to the present invention.

FIG. 6 shows a detailed exploded view of the prior art booster valve and pressure regulator valve assembly.

FIG. 7 shows a detailed exploded view of a second repaired booster valve and pressure regulator valve assembly including a modified booster valve piston and a second replacement shorter inner booster valve spring according to the present invention.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
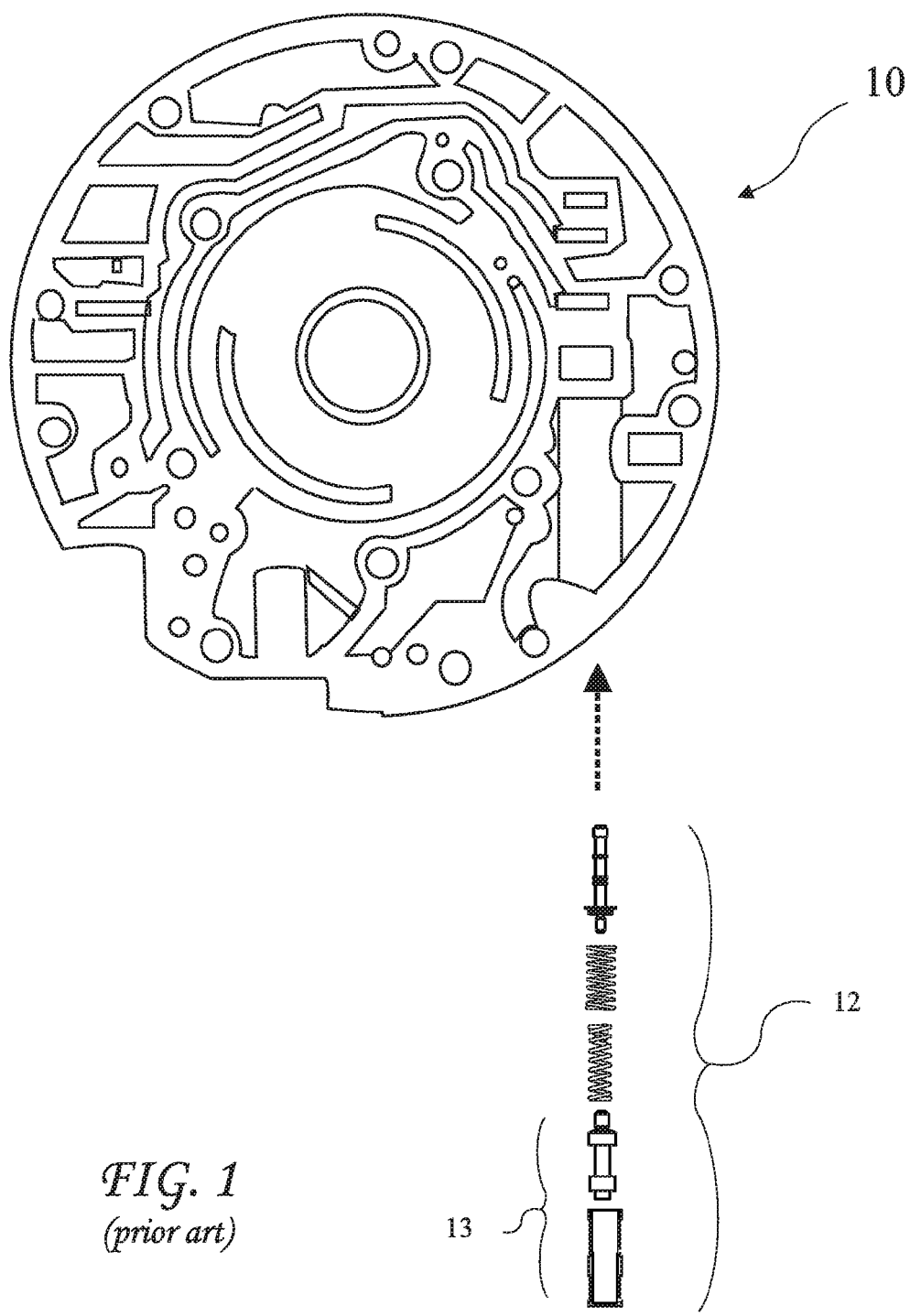
FIG. 1 shows an automatic transmission pump stator body and booster valve and pressure regulator valve assembly.

A prior art automatic transmission pump stator body 10 and exploded booster valve and pressure regulator valve assembly 12 are shown in FIG. 1. The booster valve and pressure regulator valve assembly 12 normally resides in the automatic transmission pump stator body 10 and controls an automatic transmission fluid pressure in response to reverse and pressure control solenoid pressure signals. The booster valve and pressure regulator valve assembly 12 includes a booster valve assembly 13 controlled by pressure signals 20 and 22 through ports 21 and 23 respectively (see FIG. 2A).

Figures 2A, 2B:
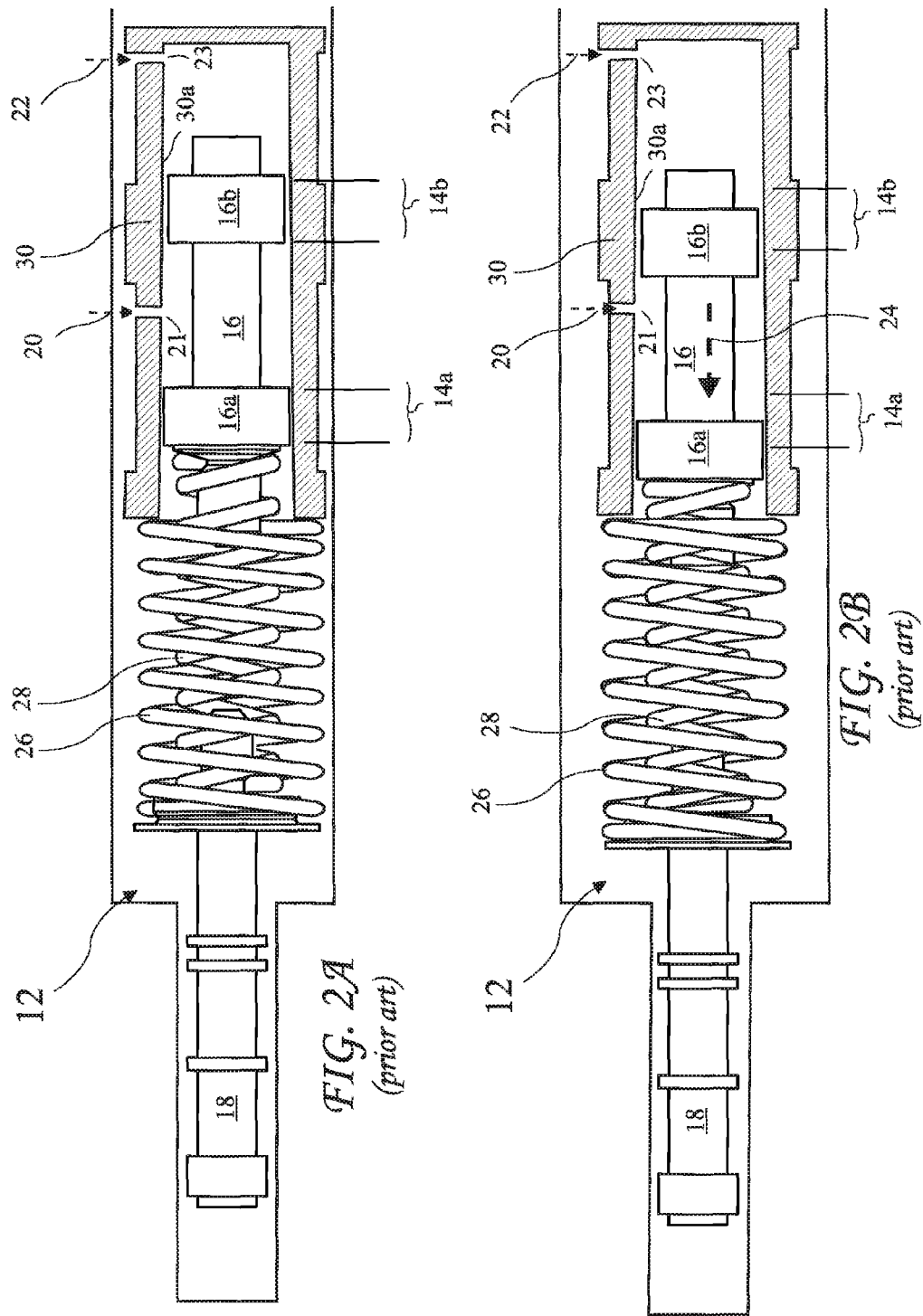
FIG. 2A shows a rest position of the booster valve and pressure regulator valve assembly including a prior art inner booster valve spring.
FIG. 2B shows an actuated position of the booster valve and pressure regulator valve assembly including the prior art inner booster valve spring.

The booster valve and pressure regulator valve assembly 12 in a rest position, including a prior art inner booster valve (or bumper) spring 28, is shown in FIG. 2A and the booster valve and pressure regulator valve assembly 12 in an actuated position is shown in FIG. 2B. A booster piston 16 shifts along arrow 24 towards a pressure regulator valve piston 18 in response to the pressure signals 20 and 22 through the ports 21 and 23 respectively and modulates the pressure regulator valve piston 18 to control automatic transmission fluid pressures. Booster valve piston lands 16a and 16b slide over worn surfaces 14a and 14b on the booster valve passage 30a inside the booster valve sleeve 30, and eventually the worn surfaces 14a and 14b wear to a degree that the booster assembly 13 fails to perform as designed requiring repair or replacement.

The booster valve and pressure regulator valve assembly 12 includes an outer (or pressure regulator valve) spring 26 and the inner booster valve (or bumper) spring 28 residing inside the outer spring 26. The inner booster valve spring 28 resides between the booster valve piston 16 and the pressure regulator valve piston 18 and the outer spring 26 resides between the booster valve sleeve 30 and the pressure regulator valve piston 18.

A repaired booster valve assembly 12a according to the present invention with the booster valve piston 16 in a second rest position shifted by a replacement longer inner booster valve spring 28a according to the present invention is shown in FIG. 3A and the repaired booster valve assembly 12a in a second actuated position is shown in FIG. 3B. The replacement inner booster valve spring 28a is longer than the inner booster valve spring 28 and shifts the booster valve piston 16 to the right to reduce or eliminate the overlap of the booster valve piston lands 16a and 16b with the worn surfaces 14a and 14b, thereby extending the life of the original booster valve assembly 13 (see FIG. 1). The booster valve piston 16 is preferably shifted an additional approximately ⅛ inch away from the pressure regulator valve piston 18.

A detailed exploded view of the prior art booster valve and pressure regulator valve assembly 12 is shown in FIG. 4 and a detailed exploded view of the repaired booster valve and pressure regulator valve assembly 12a, including the replacement longer inner booster valve spring 28a and a bumper shim 32 according to the present invention, is shown in FIG. 5. The replacement longer inner booster valve spring 28a is both longer than the original inner booster valve spring 28 and preferably has a higher spring rate than the inner booster valve spring 28, thereby moving the booster valve piston 16 to the right away from the pressure regulator valve piston 18. A bumper shim 32 preferably resides inside the replacement longer inner booster valve spring 28a to prevent the replacement longer inner booster valve spring 28a from being overly compressed, which could damage and eventually break the replacement longer inner booster valve spring 28a.

A preferred application of the present invention is to a General Motors® 4L60E automatic transmission. In this application, the replacement longer inner booster valve spring 28a is preferably made from approximately 0.0625 diameter chrome silicon wire with a free length of approximately 1.12 inches. The spring coil inside diameter is approximately 0.269 inches and the coil outside diameter is approximately 0.394 inches. The spring rate is approximately 70.837 pound-feet/inch. For the General Motors® 4L60E automatic transmission, the bumper shim 32 is preferably made from steel or aluminum and is between approximately 0.258 inches and approximately 0.260 inches in diameter and between approximately 0.12 inches and approximately 0.15 inches in length. The replacement longer inner booster valve spring 28a and the bumper shim 32 may have other specifications for other transmissions, and any method for extending the life of a booster valve assembly using a replacement spring to shift the position of the booster valve piston, in either direction, inside the booster valve sleeve is intended to come within the scope of the present invention.

For comparison to FIG. 7, a detailed exploded view of the prior art booster valve assembly 12 is again shown in FIG. 6, and a detailed exploded view of a second repaired booster valve assembly 12b including a modified booster valve piston 16a and a second replacement shorter inner booster valve spring 28b according to the present invention is shown in FIG. 7. In some instances where the booster valve passage 30a provides a sufficient surface, the booster valve assembly 13 may be repaired by shifting the booster valve piston forward towards the pressure regulator valve piston 18. In these instances, the booster valve piston 16 is preferably modified by removing (for example, grinding) material from the tip of the spooled end portion 16' of the booster valve piston 16 to obtain the modified booster valve piston 16a. Preferably, approximately ⅛ inches of material is removed from the spooled end portion 16' of the booster valve piston 16 which is approximately the distance that the modified booster valve piston 16a is shifted towards the pressure regulator valve piston 18.

Figure 8:
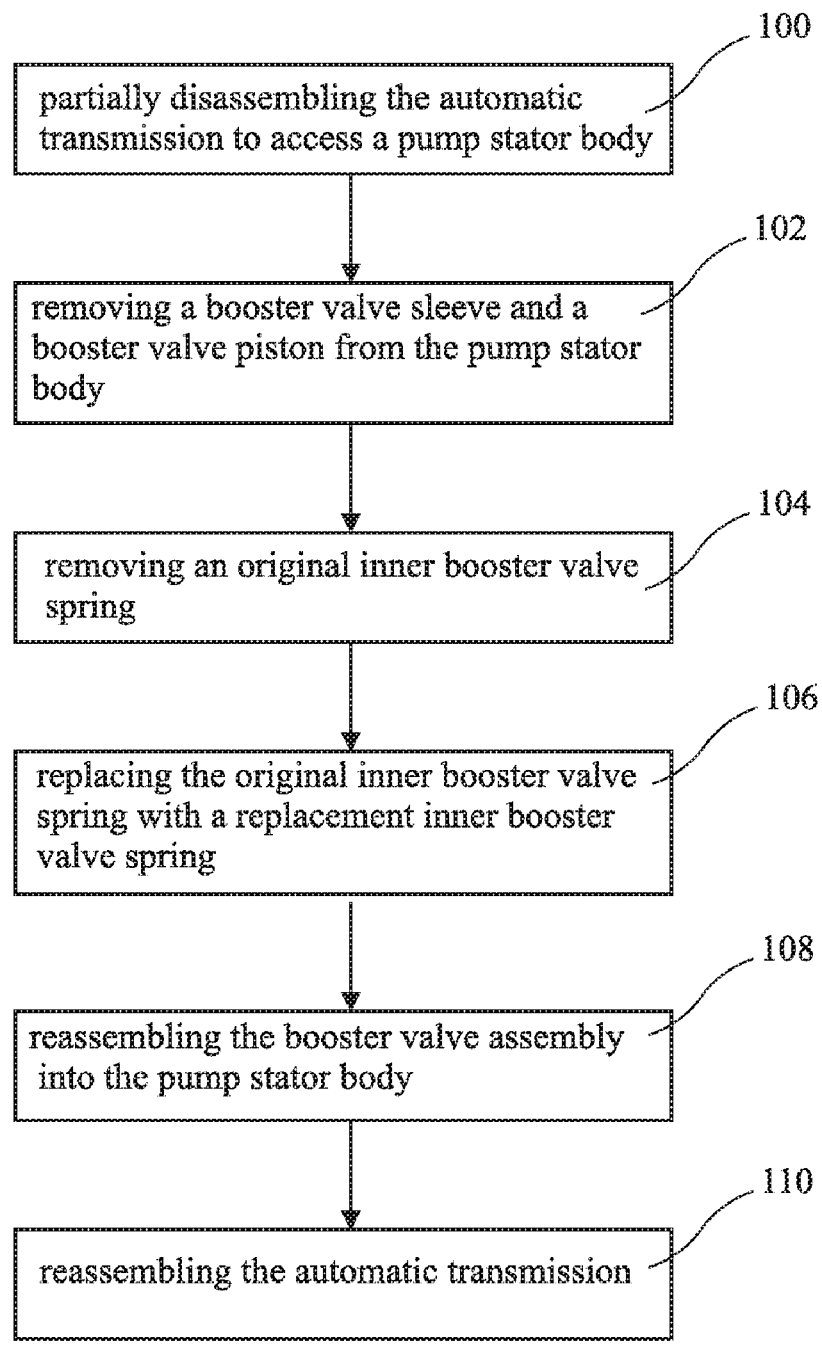
FIG. 8 describes a method according to the present invention for repairing a booster valve assembly.

A method for extending the life of an automatic transmission booster valve assembly is described in FIG. 8. The method includes steps of partially disassembling the automatic transmission to access a pump stator body of the automatic transmission at step 100, removing a booster valve sleeve and a booster valve piston from the pump stator body at step 102, removing an original inner booster valve (or bumper) spring normally residing between the booster valve piston and a pressure regulator valve piston inside an outer (or pressure regulator valve) spring at step 104, replacing the original inner booster valve spring with a replacement inner booster valve spring having a longer length L and higher spring rate than the original inner booster valve spring at step 106, reassembling the booster valve assembly into the pump stator body at step 108, and reassembling the automatic transmission at step 110. In a preferred embodiment, a shim is inserted into the replacement booster valve spring between the booster valve piston and the pressure regulator valve piston 18. The replacement inner booster valve spring is configured to shift an operating range of the booster valve piston from a worn portion of a booster valve passage in the booster valve sleeve to an unworn portion of the booster valve passage thereby extending the life of the original booster valve piston and booster valve sleeve.

While the invention herein disclosed has been described by means of specific embodiments and applications thereof, numerous modifications and variations could be made thereto by those skilled in the art without departing from the scope of the invention set forth in the claims.

I claim:

1. A method for extending the life of an automatic transmission booster valve, the method comprising:
   partially disassembling the automatic transmission;
   disassembling a booster valve assembly including an original booster valve piston and an original booster valve sleeve from the automatic transmission;
   removing an original booster valve spring of the booster valve assembly;
   replacing the original booster valve spring with a replacement booster valve spring configured to shift an operating range of a booster valve piston from a worn portion of a booster valve passage to an unworn portion of the booster valve passage;

removing ⅛ inches of material from a spooled end portion of the booster valve piston;

reassembling the booster valve assembly using the original booster valve piston and the original booster valve sleeve into the automatic transmission; and reassembling the automatic transmission.

2. The method of claim 1, wherein replacing the original booster valve spring with a replacement spring comprises replacing the original booster valve spring with a longer replacement booster valve spring configured to shift the operating range of the booster valve piston from the worn portion of the booster valve passage to the unworn portion of the booster valve passage.

3. The method of claim 2, wherein replacing the original booster valve spring with a longer replacement booster valve spring comprises replacing the original booster valve spring with a longer and higher spring rate replacement booster valve spring configured to shift the operating range of the booster valve piston from the worn portion of a booster valve passage to the unworn portion of the booster valve passage.

4. The method of claim 2, the method further including inserting a bumper shim inside the replacement booster valve spring between the booster valve piston and a pressure regulator valve piston to prevent contact between the booster valve piston and the pressure regulator valve piston.

5. The method of claim 1, wherein replacing the original booster valve spring with a replacement booster valve spring comprises replacing the original booster valve spring with a shorter replacement booster valve spring configured to shift an operating range of the booster valve piston from the worn portion of the booster valve passage to the unworn portion of the booster valve passage.

6. The method of claim 1, wherein replacing the original booster valve spring with a replacement booster valve spring comprises replacing an original booster valve inner spring residing inside an outer spring with a replacement inner booster valve spring configured to shift an operating range of the booster valve from a worn portion of a booster valve passage to an unworn portion of the booster valve passage.

7. The method of claim 1, wherein the inner booster valve spring is made from approximately 0.0625 inch diameter chrome silicon wire with a free length of approximately 1.12 inches, a coil inside diameter of approximately 0.269 inches and a coil outside diameter is approximately 0.394 inches.

8. The method of claim 1, wherein the inner booster valve spring has a free length of approximately 1.12 inches and a spring rate of approximately 70.837 pound-feet/inch.

9. A method for extending the life of an automatic transmission booster valve, the method comprising:

partially disassembling the automatic transmission to access a pump stator body of the automatic transmission;

removing an original booster valve sleeve and an original booster valve piston from the pump stator body;

removing an original inner booster valve spring normally residing between the booster valve piston and a pressure regulator valve piston inside an outer spring;

replacing the original inner booster valve spring with a replacement inner booster valve spring having a longer length L and higher spring rate than the original inner booster valve spring, the replacement inner booster valve spring configured to shift an operating range of the booster valve piston from a worn portion of a booster valve passage in the booster valve sleeve to an unworn portion of the booster valve passage;

inserting a bumper shim inside the replacement inner booster valve spring between the pressure regulator valve piston and the booster valve piston, reassembling the booster valve assembly using the original booster valve piston and the original booster valve sleeve into the pump stator body; and reassembling the automatic transmission wherein the inner booster valve spring has a free length of 1.12 inches and a spring rate of 70.837 pound-feet/inch; wherein the bumper shim is made from material selected from the group consisting of steel and aluminum and is between 0.12 inches and 0.15 inches in length; and wherein the bumper shim is between 0.258 inches and 0.260 inches in diameter.

10. The method of claim 9, wherein inserting the bumper shim inside the replacement inner booster valve spring comprises inserting a bumper shim inside the replacement booster valve spring between the booster valve piston and a pressure regulator valve piston and aligned with the booster valve piston and a pressure regulator valve piston to prevent contact between the booster valve piston and the pressure regulator valve piston.

11. The method of claim 9, wherein inserting the bumper shim inside the replacement inner booster valve spring comprises inserting a bumper shim inside the replacement booster valve spring between the booster valve piston and a pressure regulator valve piston and aligned coaxially with the booster valve piston and a pressure regulator valve piston to prevent contact between the booster valve piston and the pressure regulator valve piston.

12. The method of claim 9, wherein the inner booster valve spring is made from approximately 0.0625 inch diameter chrome silicon wire with a free length of approximately 1.12 inches, a coil inside diameter of approximately 0.269 inches and a coil outside diameter is approximately 0.394 inches.

* * * * *